(12) United States Patent
Boeck

(10) Patent No.: US 6,625,989 B2
(45) Date of Patent: Sep. 30, 2003

(54) METHOD AND APPARATUS FOR THE COOLING OF JET-ENGINE TURBINE CASINGS

(75) Inventor: Alexander Boeck, Kottgeisering (DE)

(73) Assignee: Rolls-Royce Deutschland Ltd & Co KG, Dahlewitz (DE)

( * ) Notice: Subject to any disclaimer, the term of this patent is extended or adjusted under 35 U.S.C. 154(b) by 0 days.

(21) Appl. No.: 09/836,535

(22) Filed: Apr. 18, 2001

(65) Prior Publication Data

US 2002/0005038 A1 Jan. 17, 2002

(30) Foreign Application Priority Data

Apr. 19, 2000 (DE) .......................................... 100 19 437

(51) Int. Cl.[7] .............................. F01D 25/14; F02K 3/02
(52) U.S. Cl. ...................... 60/782; 60/226.1; 415/178
(58) Field of Search ................................ 60/204, 226.1, 60/782, 785; 415/115, 116, 117, 178

(56) References Cited

U.S. PATENT DOCUMENTS

| | | | | |
|---|---|---|---|---|
| 4,019,320 A | * | 4/1977 | Redinger et al. | 60/226.1 |
| 4,023,919 A | * | 5/1977 | Patterson | 415/178 |
| 4,271,666 A | * | 6/1981 | Hurley et al. | 60/226.1 |
| 4,363,599 A | * | 12/1982 | Cline et al. | 415/178 |
| 4,493,184 A | | 1/1985 | Nikkanen et al. | |
| 4,512,712 A | * | 4/1985 | Baran, Jr. | 415/178 |
| 4,526,226 A | * | 7/1985 | Hsia et al. | 415/178 |
| 4,541,774 A | | 9/1985 | Riecke et al. | |
| 4,542,623 A | | 9/1985 | Hovan et al. | |
| 4,807,433 A | | 2/1989 | Maclin et al. | |
| 4,841,726 A | * | 6/1989 | Burkhardt | 60/226.1 |
| 4,901,520 A | | 2/1990 | Kozak et al. | |
| 5,048,288 A | * | 9/1991 | Bessette et al. | 60/226.1 |
| 5,152,666 A | * | 10/1992 | Stripinis et al. | 415/178 |
| 5,261,228 A | * | 11/1993 | Shuba | 60/226.3 |
| 5,305,616 A | | 4/1994 | Coffinberry | |
| 5,392,614 A | | 2/1995 | Coffinberry | |
| 5,540,547 A | | 7/1996 | Cole | |
| 5,915,919 A | * | 6/1999 | Taillant et al. | 415/178 |

FOREIGN PATENT DOCUMENTS

DE   3447717   7/1985

* cited by examiner

Primary Examiner—Michael Koczo
(74) Attorney, Agent, or Firm—Davidson Berquist Klima and Jackson, LLP

(57) ABSTRACT

This invention relates to a method and an apparatus for the cooling of the casing (1) of the turbines (2, 3) of jet engines, in which cooling air is diverted from a bypass flow and supplied to the outer side of the casing via an inlet duct (8) provided with a shut-off element (5). According to the present invention, the cooling air is supplied to a first chamber (6) in which it is divided by volume. One portion of the cooling air is issued to the casing (1) via orifice holes (10), while another portion is ducted via several tubes (9) to a second chamber (7) which annularly encloses the casing (1) in the area of a low-pressure turbine (3).

18 Claims, 3 Drawing Sheets

METHOD AND APPARATUS FOR THE COOLING OF JET-ENGINE TURBINE CASINGS

BACKGROUND OF THE INVENTION

This invention relates to a method for the cooling of jet-engine turbine casings, in which cooling air is diverted from a bypass flow and is routed to the outer side of the casing via a duct provided with a shut-off element.

With regard to the apparatus, this invention relates to an arrangement for the cooling of turbine and jet-engine casings with at least one inlet duct for the conduction of cooling air from a bypass flow and with at least one shut-off element associated with said inlet duct.

In the prior art, a large one-stage fan is provided on bypass gas turbine engines which delivers one portion of the air flow through the core engine and another portion of the air flow as bypass through a closed annular duct. Prior art further provides clearance control on a high-pressure or a low-pressure turbine for the purpose of keeping the tip clearances small and avoiding flow losses at the blade tips. For this purpose, cooling air is actively applied to the casings depending on the operating condition of the engine. The decrease of the casing inner diameter effected by this means allows for control of the tip clearance.

Prior art provides different arrangements for effecting an appropriate cooling of the casings. U.S. Pat. No. 4,493,184, for example, discloses an inlet duct for the diversion of cooling air from the bypass flow. This cooling air is conveyed to a multitude of concentrically arranged annular ducts which are provided with outlet ports to conduct the cooling air to the outer wall of the casings of the turbines. Similar designs are disclosed in the U.S. Pat. Nos. 5,540, 547, 5,392,614 and 5,305,616. These designs are particularly common for engines with C ducts, i.e. with hinged fan air ducts at each side.

The known designs have the disadvantage that, upon shut-off of the cooling air, the ventilation flow of the core engine is further applied to the casings. This results in a heat transfer which gives rise to a cooling of the casings and, consequently, a reduction of the tip clearance. Since the turbine discs cool down considerably slower than the casing under some operating conditions, for example during standstill of the engine in flight, contact between the blades and the casings may occur which may result in damage of the engine upon restart.

A further disadvantage is the high efforts and costs incurred by design, construction and manufacture of the annular ducts enclosing the engine.

The conduction of the cooling air into an interspace which surrounds the casing of the turbine that has already been suggested is difficult to realize because of the high pressure occurring, in particular in the case of the hinged fan air ducts at each side.

A further problem of the known designs is the adequate cooling of the downstream portion of the turbines, in particular the low-pressure turbine, this problem resulting from the cooling air heating up when initially applied onto the turbine casing in the area of the high-pressure turbine.

BRIEF SUMMARY OF THE INVENTION

A broad aspect of the present invention is to provide a method and an apparatus of the type described at the beginning which combine simplicity of design as well as dependability and safety of operation with reliability of cooling of the various casings or casing areas of turbines and which, at the same time, are capable of avoiding the undesired excessive cooling under certain operating conditions.

It is a particular object of the present invention to provide remedy to the said problem by the combination of the characteristics of the two independent claims, with further objects and advantages of the invention being cited in the respective subclaims.

With regard to the method, the present invention provides for an arrangement where the cooling air is conducted into a first chamber, where it is divided by volume, one portion of the cooling air from the first chamber being applied to the outer side of the casing while another portion is ducted to a second chamber arranged downstream of the first chamber and is applied from this second chamber to the outer side of the casing.

With regard to the apparatus, the present invention provides an arrangement where the inlet duct enters at least one first buffer chamber which is provided with outlet ports for the conduction of cooling air to the outer side of the casing and to which at least one tube is connected which is joined to at least a second buffer chamber to conduct a portion of the cooling air into this second buffer chamber, said second buffer chamber being provided with cooling air outlet ports to the outer side of the casing.

Both the method and the apparatus in accordance with the present invention provide various, considerable improvements over the prior art.

The introduction of the cooling air into a first chamber, the division of the cooling air by volume in this first chamber and the conduction of a portion of the cooling air to the second chamber via the tube enables the application of fresh, i.e. cold, cooling air from both the first and the second chamber to the outer side of the casings of the turbines. This arrangement provides remedy to the problem in the prior art of undesired heating of the cooling air which subsequently is still to be used upon first application to the outer side of the casings.

Furthermore, the present invention simplifies construction considerably, since relatively large chambers enclosing the corresponding portions of the casings of the turbines can be used. Thus, an annulus is formed to which cooling air can be applied in a controlled manner. In contrast to this, a solution in accordance with the prior art using the known annular tubes entails higher constructional effort and, consequently, increased costs.

Since the chambers in accordance with the present invention form an annulus which encloses the casing areas of the turbines, control or regulation of the cooling air is particularly simple. When the shut-off element is closed, an annulus is formed which is neither affected by cooling air nor by a ventilation flow. Thus, the casing can be thermally insulated to preclude undesired or excessive cooling.

A further, significant improvement arises from the tubes connecting the first chamber with the second chamber. These tubes can be designed in a very simple way, and thus cost improvements are achieved in comparison with the annular tubes known from the prior art.

With regard to the method, a preferred development of the present invention provides for discharge of the respective cooling air upon application to the outer side of the casing. Accordingly, fresh, cold cooling air is applied to the individual areas of the casing to achieve the desired cooling and the requisite tip-clearance control in the area of the low-pressure turbine, as well.

The design of the chambers as buffer chambers enables the build-up of the desired pressure conditions and, at the same time, precludes undesired high pressures which would incur high mechanical loads, in particular with regard to the hinged fan air ducts at each side.

The present invention also provides for issue of the cooling air from the chambers via orifices. This arrangement enables the flow characteristics of the cooling air to be influenced in a controlled manner.

Furthermore, the present invention provides for discharge of the cooling air down the stream into a core engine area upon impingement on the outer side of the casing. This arrangement provides for good airflow.

With regard to the apparatus, a particularly beneficial aspect of the present invention is that both the first and the second buffer chamber can be designed as at least partly annular chambers. For engine design, therefore, a hinged arrangement at each side may be provided, which is particularly advantageous in terms of maintainability. In contrast to this arrangement, however, the two buffer chambers may also be designed as a closed annular chamber.

To ensure that the volume of cooling air issued from the first to the second chamber is adequate, it is particularly advantageous to provide several circumferentially distributed tubes. In a preferred embodiment, the tubes are designed and installed such that a slideable connection with at least one buffer chamber is provided to compensate for heat-expansion effects.

In a favourable development of the present invention, the first and the second buffer chamber are sealed to the casing at their upstream sides. With this arrangement, the inner side of the chambers provides for thermal insulation of the casing when the shut-off element is closed.

In a preferred embodiment, the second buffer chamber is open downstream to ensure the undisturbed discharge of the cooling air. In the second buffer chamber, at least one baffle may be provided to ensure the uniform application of cooling air to the outer side of the casing.

In a favourable arrangement, the first buffer chamber is associated with a high-pressure turbine, while the second chamber is located in the area of a low-pressure turbine.

Apparently, the present invention also provides for several buffer chambers arranged on the circumference of the casing, each of these buffer chambers enclosing part of the circumferential area of the casing. In addition, it is also possible to provide for several buffer chambers arranged one behind the other in the direction of flow, instead of the first and second chamber described above.

Accordingly, the function of the present invention is as follows: Air from the bypass duct is led to the chambers via one or several NACA inlets and valves.

From the first chamber or chambers, cooling air is ducted to the high-pressure turbine casing via orifices. Since the first chamber is sealed as tightly as possible with the flange of the high-pressure turbine casing at the upstream side, the cooling air will in essence only flow downstream into the core-engine area. On the low-pressure turbine, a duct-shaped second chamber is arranged which is sealed tightly with the casing of the low-pressure turbine at the upstream side and which is open at the downstream end. Said duct-shaped chamber is connected with the first chamber for the cooling of the high-pressure turbine via individual, insertion-fit tubes to supply cooling air for the cooling of the low-pressure turbine. The baffle provides for division of the second chamber into sub-chambers so that the cooling air supplied via the tubes is distributed uniformly on the circumference of the low-pressure turbine casing. Accordingly, the air axially passes the casing of the low-pressure turbine and exits at the end of the second chamber, where it mixes with the ventilation air and with the air for the cooling of the high-pressure turbine which has already exited from the first chamber and finally discharges to the environment via an annulus at the engine nozzle.

The individual tubes provide for free access to the area of the high-pressure turbine casing. This facilitates the installation of supply and gauge lines as well as pertinent maintenance work.

BRIEF DESCRIPTION OF THE DRAWINGS

The invention is more fully described in light of the accompanying drawing showing an embodiment of the present invention. On the drawings.

DETAILED DESCRIPTION OF THE INVENTION

Figure 1:
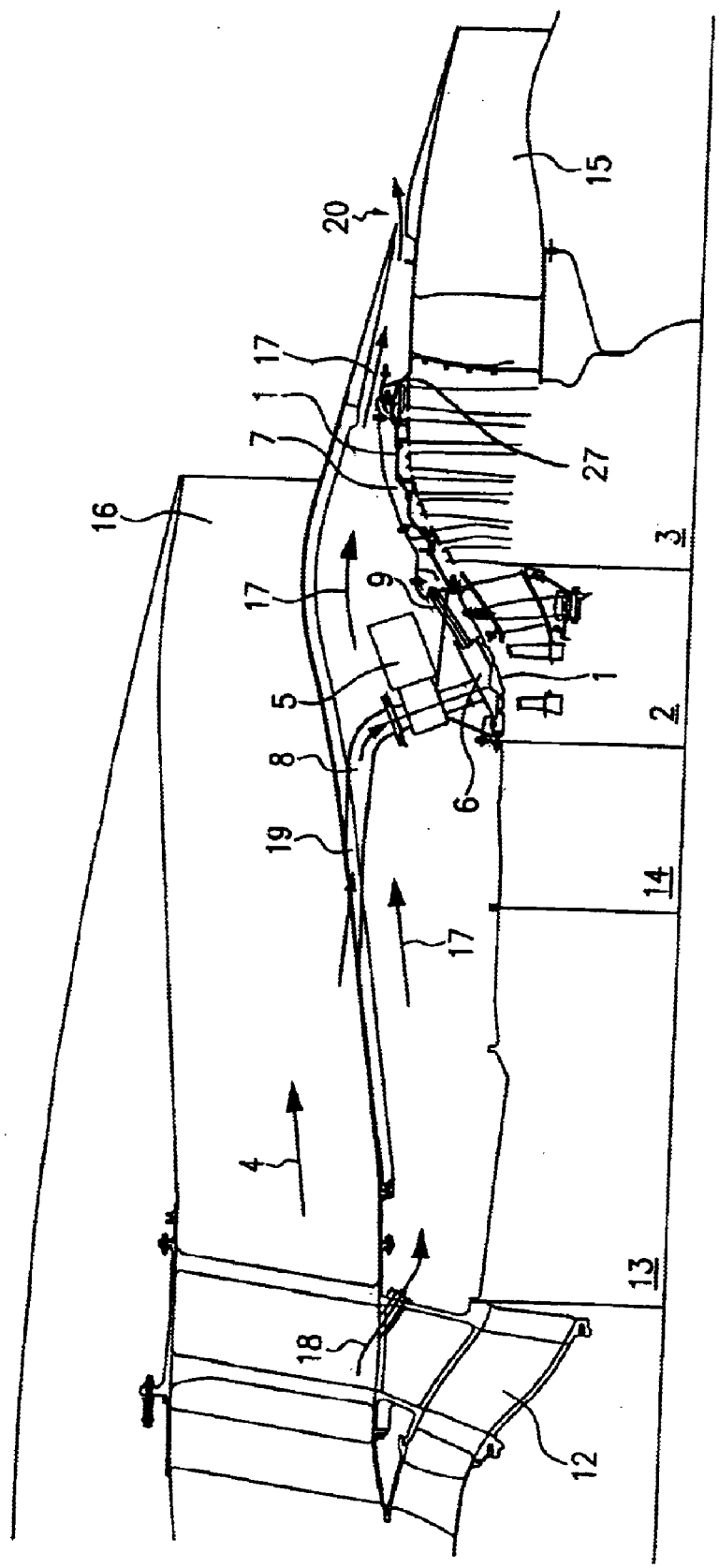
FIG. 1 is a simplified schematic partial view of a jet engine featuring the apparatus in accordance with this invention.

FIG. 1 illustrates a part of a jet engine featuring a fan in axial section. The individual components are shown only schematically since their design is known from the prior art and, accordingly, a detailed discussion can be dispensed with herein.

FIG. 1 shows a casing 1 which contains a high-pressure turbine 2 and a low-pressure turbine 3. In the area of the high-pressure turbine 2, a first chamber 6 is provided which connects to a second chamber 7 via tubes 9. Cooling air is supplied from a bypass flow 4 via an inlet duct 8 which is provided with a shut-off element (valve) 5.

In addition, FIG. 1 shows the following items of a jet engine in simplified representation: an inlet 12 for a compressor 13, a combustion chamber 14, a nozzle 15 of the core engine, a nozzle 16 of the fan, a ventilation flow 17 with an inlet flow 18, a NACA inlet 19 and an exit gap 20 of the ventilation flow 17.

Figure 2:
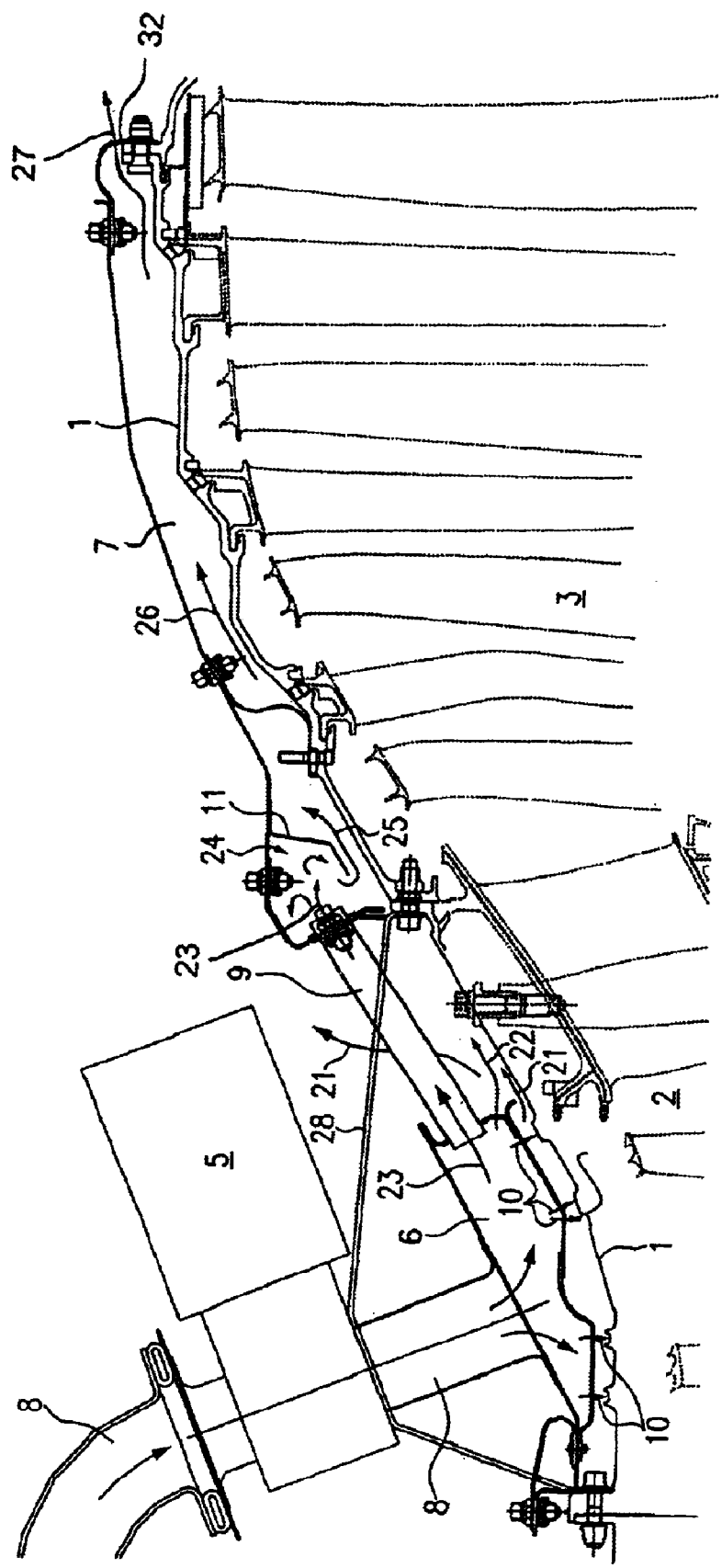
FIG. 2 is an enlarged partial view of FIG. 1.
Figure 3:
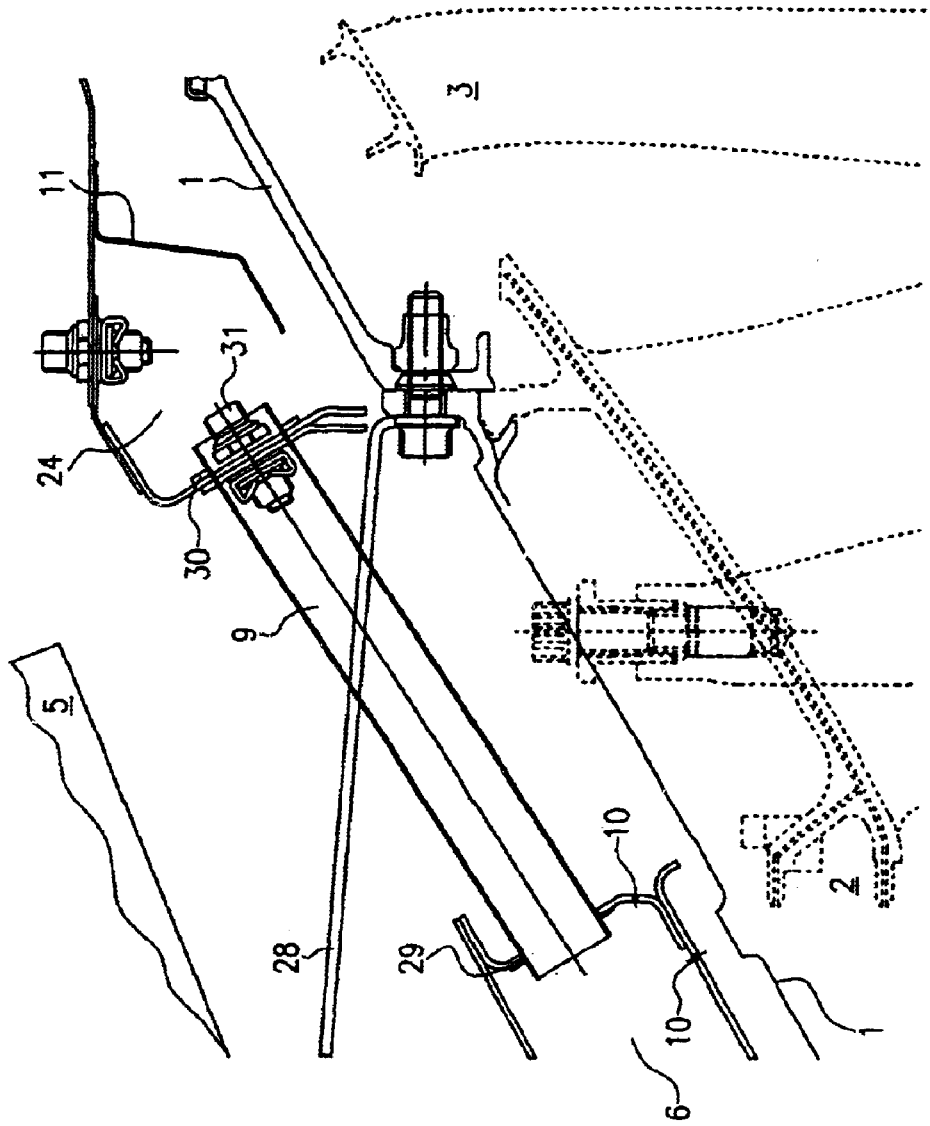
FIG. 3 is an enlarged schematic view of the tube in accordance with the present invention.

The development of the chambers 6 and 7 and of the tube 9 according to the present invention is shown in an enlarged view in FIG. 2 and 3. FIG. 2 also shows the flow passage through the inlet duct 8, the first chamber 6, the tube 9 and the second chamber 7.

Both the first chamber 6 and the second chamber 7 are sealed at their upstream sides to avoid undesired entry of air from the ventilation flow 17. The first chamber 6 is essentially designed as a closed chamber and contains several orifice holes 10 towards the casing 1 of the high-pressure turbine 2. Through these orifice holes, cooling air exits to casing 1, as shown by the arrows. This cooling air discharges at the downstream area of the chamber 6, as shown by arrow 21, and exits between the tubes 9. The casing section which is in the area of the tubes 9 is subjected to a cooling airflow 22 exiting from the chamber 6. A portion of the cooling air supplied via inlet duct 8, represented by arrow 23 flows through the various tubes 9 and enters the second chamber 7. This chamber is also sealed towards the casing at the upstream side and contains a baffle 11 inside, which forms an attenuation chamber 24. The airflow exits from this attenuation chamber, as shown by arrow 25, and flows through the second chamber 7, as shown by arrow 26, to discharge through exit holes 32 at the downstream open end of the chamber, as shown by arrow 27.

The shut-off element 5 provided for stoppage of the supply of cooling air through the inlet duct 8 can be designed as a valve. As it will become apparent from FIG. 2, the interior space of the first chamber 6 and of the second chamber 7 will then form an insulation area to preclude undesired cooling of the casing 1. Reference numeral 28 shows a support for the shut-off element 5.

FIG. 3 is an enlarged representation of the arrangement of the individual tubes 9. In the area of the wall of the first chamber 6, the tube 9 is slideably located by means of an insertion-fit connection 29 to compensate for heat-expansion effects. The downstream end of tube 9 is firmly and tightly connected with the wall of the second chamber 7 by means of a flange 30 and a threaded joint 31.

A plurality of modifications may be made to the embodiment shown here without departing from the inventive concept expressed.

In summary, the present invention relates to a method and an apparatus for the cooling of the casings 1 of the turbines 2, 3 of jet engines, in which cooling air is diverted from a bypass flow and supplied to the outer side of the casing via an inlet duct 8 provided with a shut-off element 5. According to the present invention, the cooling air is supplied to a first chamber 6 in which it is divided by volume. One portion of the cooling air is issued to the casing 1 via orifice holes 10, while another portion is ducted via several tubes 9 to a second chamber 7 which annularly encloses the casing 1 in the area of a low-pressure turbine 3. (FIG. 2).

List of Reference Numerals

1 Casing
2 High-pressure turbine
3 Low-pressure turbine
4 Bypass flow
5 Shut-off element (valve)
6 First chamber
7 Second chamber
8 Inlet duct
9 Tube
10 Orifice hole
11 Baffle
12 Inlet of compressor
13 Compressor
14 Combustion chamber
15 Nozzle of core engine
16 Nozzle of fan
17 Ventilation flow
18 Inlet of the ventilation flow
19 NACA inlet
20 Exit gap of ventilation flow 17
21 Airflow
22 Airflow
23 Airflow
24 Attenuation chamber
25 Airflow
26 Airflow
27 Airflow
28 Support of shut-off element 5
29 Insertion-fit connection
39 Flange
31 Threaded joint

What is claimed is:

1. A method for the cooling of a casing of turbines of a jet engine, in which cooling air is diverted from a bypass flow and supplied to an outer side of the casing via an inlet duct provided with a shut-off element, wherein the cooling air is fed into a first chamber in which the cooling air is divided by volume, one portion of the cooling air being issued from the first chamber to the outer side of the casing and another portion being ducted to a second chamber downstream of the first chamber and being applied to the outer side of the casing from said second chamber.

2. A method in accordance with claim 1, wherein the respective cooling air is discharged upon application to the outer side of the casing.

3. A method in accordance with claim 1, wherein the chambers act as buffer chambers.

4. A method in accordance with claim 1, wherein the cooling air is issued from the chambers via orifices.

5. A method in accordance with claim 1, wherein the cooling air is discharged downstream into a core engine area upon impingement onto the outer side of casing.

6. An apparatus for the cooling of the a casing of turbines of a jet engine with at least one inlet duct for the conduction of cooling air from a bypass flow and with at least one shut-off element associated with the inlet duct, wherein the inlet duct leads into at least one first buffer chamber which is provided with exit holes for the application of cooling air to an outer side of the casing and is connected to at least one tube to supply a portion of the cooling air into at least a second buffer chamber, the second buffer chamber being provided with exit holes for the application of cooling air to the outer side of the casing.

7. An apparatus in accordance with claim 6, wherein the first buffer chamber and the second buffer chamber are designed at least partially annular.

8. An apparatus in accordance with claim 6, wherein the first buffer chamber and the second buffer chamber are designed as annular chambers.

9. An apparatus in accordance with claim 6, wherein several tubes are circumferentially distributed around the casing.

10. An apparatus in accordance with claim 6, wherein the first buffer chamber is provided with orifice holes towards the outer side of the casing.

11. An apparatus in accordance with claim 6, wherein the first buffer chamber and the second buffer chamber are sealed upstream towards the casing.

12. An apparatus in accordance with claim 6, wherein the second buffer chamber is open downstream.

13. An apparatus in accordance with claim 6, wherein the second buffer chamber contains at least one baffle.

14. An apparatus in accordance with claim 6, wherein the first buffer chamber is associated with a high-pressure turbine.

15. An apparatus in accordance with claim 6, wherein the second buffer chamber is associated with a low-pressure turbine.

16. An apparatus in accordance with claim 6, wherein several buffer chambers are arranged on the circumference of the casing.

17. An apparatus in accordance with claim 6, wherein several buffer chambers are arranged behind the other in the direction of the flow.

18. An apparatus in accordance with claim 6, wherein the tube is slideably connected with at least one buffer chamber to compensate for thermal expansion.

* * * * *